US012770420B1

(12) United States Patent
Garrison

(10) Patent No.: US 12,770,420 B1
(45) Date of Patent: Oct. 20, 2026

(54) SYSTEM AND METHOD FOR AUTHENTICATING IMAGES

(71) Applicant: LotLenz Technologies LLC, Palm Coast, FL (US)

(72) Inventor: Michael Garrison, Palm Coast, FL (US)

(73) Assignee: LotLenz Technologies LLC, Palm Coast, FL (US)

( * ) Notice: Subject to any disclaimer, the term of this patent is extended or adjusted under 35 U.S.C. 154(b) by 0 days.

(21) Appl. No.: 19/451,851

(22) Filed: Jan. 16, 2026

Related U.S. Application Data

(60) Provisional application No. 63/916,990, filed on Nov. 13, 2025.

(51) Int. Cl.
*G06V 20/00* (2022.01)
*G06V 10/70* (2022.01)
*G06V 10/764* (2022.01)

(52) U.S. Cl.
CPC ............ *G06V 20/95* (2022.01); *G06V 10/764* (2022.01); *G06V 10/768* (2022.01)

(58) Field of Classification Search
None
See application file for complete search history.

(56) References Cited

U.S. PATENT DOCUMENTS 7,868,933 B2 1/2011 Kawazu
8,761,521 B2 6/2014 Yoshioka
(Continued)

FOREIGN PATENT DOCUMENTS

CN 111881844 11/2020
EP 4485261 1/2025
(Continued)

OTHER PUBLICATIONS

Kyra Wittorf, Martin Steinebach, Huajian Liu, "Automated Image Metadata Verification" in Proc. IS&T Int'l. Symp. on Electronic Imaging: Media Watermarking, Security, and Forensics, 2021, pp. 274-1-274-6, https://doi.org/10.2352/ISSN.2470-1173.2021.4.MWSF-274 (Year: 2021).*
AI vs. AI: Can AI Detect AI-Generated Images? Baraheem, S. S., & Nguyen, T. V. (2023). AI vs. AI: Can AI Detect AI-Generated Images? Journal of Imaging, 9(10), 199. https://doi.org/10.3390/jimaging9100199 (Year: 2023).*
(Continued)

*Primary Examiner* — SJ Park
*Assistant Examiner* — Caroline E. DePalma
(74) *Attorney, Agent, or Firm* — Malloy & Malloy, PL; W. John Eagan; Rafay Asrar

(57) ABSTRACT

A system and method for authenticating digital images are disclosed. The system receives a digital image from an image capture device or an external image source and obtains contextual data associated with the image, including capture-related metadata and optional external identifiers corresponding to a subject depicted in the image. Visual characteristics of the image are analyzed using one or more machine learning models to identify indicators of authenticity, manipulation, reuse, or synthetic generation. Results of the visual analysis are correlated with the contextual data to determine consistency with expected capture conditions, and an authenticity determination is generated based on the correlation. The system may assign an authenticity score, classify the image based on the score, and output an authentication result or certification token for downstream use. The disclosed approach enables automated, scalable image authentication while accommodating common image processing workflows and heterogeneous image sources.

35 Claims, 2 Drawing Sheets

(56) References Cited

U.S. PATENT DOCUMENTS

| | | | | |
|---|---|---|---|---|
| 9,300,678 | B1 | 3/2016 | Stack et al. | |
| 9,582,843 | B2 | 2/2017 | Leonard et al. | |
| 10,885,531 | B2 | 1/2021 | Burgin et al. | |
| 11,004,187 | B2 | 5/2021 | Kuruvilla et al. | |
| 11,475,660 | B2 | 10/2022 | Guo | |
| 11,727,721 | B2 | 8/2023 | Verma et al. | |
| 12,020,506 | B2 | 6/2024 | Verma et al. | |
| 12,395,354 | B1 | 8/2025 | Aspler Yaskil et al. | |
| 2022/0261580 | A1* | 8/2022 | Soryal .................. | G06V 40/176 |
| 2023/0061517 | A1* | 3/2023 | Yang .................... | G06V 10/774 |
| 2023/0162243 | A1 | 5/2023 | Southin | |
| 2023/0289887 | A1 | 9/2023 | Gupta et al. | |

FOREIGN PATENT DOCUMENTS

| | | |
|---|---|---|
| WO | WO2023038734 | 3/2023 |
| WO | WO2025004080 | 1/2025 |

OTHER PUBLICATIONS

S. Bianchi, M. Iuliani, A. Paghera, M. Fontani and M. Jerian, "Assessing shadows and reflections consistency in AI-generated images, " 2024 IEEE International Workshop on Information Forensics and Security (WIFS), Rome, Italy, 2024, pp. 1-6. (Year: 2024).*

M. Nguyen, K. T. P. Tran, T. H. Huynh, T. T. Luong and W. Q. Yan, "Trusted Proof: Verifying Photographic Authenticity via Multi-Camera Stereo Vision for Insurance and Forensic Applications," 2025 International Conference on Multimedia Analysis and Pattern Recognition (MAPR), Khanh Hoa, Vietnam, 2025. (Year: 2025).*

Kherraz, Houssam. "On-Device Watermarking: A Socio-Technical Imperative for Authenticity in the Age of Generative AI." arXiv preprint arXiv:2504.13205 (2025). (Year: 2025).*

Wang et al. https://worldwide.espacenet.com/patent/search/family/073205684/publication/CN111881844A?q=pn%3DCN111881844A, CN111881844_Translation, Nov. 3, 2020.

* cited by examiner

METHOD FLOWCHART

Method for authenticating a digital image

200

SYSTEM AND METHOD FOR AUTHENTICATING IMAGES

CLAIM OF PRIORITY

The present application is based on, and a claim of priority is made under 35 U.S.C. Section 119(e) to a provisional patent application that is currently in the U.S. Patent and Trademark Office, namely, that having Ser. No. 63/916,990 and a filing date of Nov. 13, 2025, and which is incorporated herein by reference in its entirety.

FIELD OF THE INVENTION

The present disclosure relates generally to digital image processing and analysis. More particularly, the present disclosure relates to systems and methods for authenticating digital images, including determining whether a digital image accurately represents a real-world subject and has not been manipulated, altered, reused, or synthetically generated.

DESCRIPTION OF THE RELATED ART

Digital images are increasingly relied upon as authoritative representations of real-world objects, environments, and events across a wide range of commercial, regulatory, and informational contexts. Images are used to support transactional decisions, convey factual representations, establish trust between parties, and enable automated processing by downstream systems. In many environments, a digital image is no longer treated as merely illustrative content, but rather as a functional data artifact upon which compliance determinations, valuation assessments, and consumer confidence depend. As digital platforms continue to scale, the volume of images captured, transmitted, analyzed, and published has increased dramatically, intensifying the technical challenges associated with ensuring image authenticity and integrity.

Modern image capture typically occurs on consumer-grade devices such as smartphones, tablets, or digital cameras that automatically generate metadata associated with the captured image. This metadata may include information such as capture time, capture location, device identifiers, camera settings, and other contextual parameters. When preserved, such metadata can provide valuable context regarding the circumstances under which an image was created. However, digital images rarely remain confined to the original capture environment. Instead, images are routinely transmitted through messaging systems, uploaded to content management platforms, resized or compressed for performance reasons, and redistributed through third-party services. During these processes, metadata is often modified or entirely removed, either intentionally or as a byproduct of automated processing pipelines. As a result, images that initially contained contextual information useful for authentication may reach end users devoid of any reliable capture data.

The loss of metadata creates a significant gap between the image itself and the circumstances it purports to represent. Once stripped of contextual identifiers, an image becomes increasingly difficult to evaluate with respect to questions such as when it was captured, where it was captured, whether it depicts a specific physical asset, or whether it has been reused across unrelated contexts. In large-scale systems that ingest images from numerous sources, this gap introduces uncertainty that is difficult to resolve through manual inspection or simple automated checks. The absence of reliable metadata also complicates efforts to establish traceability or chain-of-custody for images as they move through multiple systems and organizations.

In parallel with these metadata challenges, image manipulation technologies have advanced rapidly. Editing tools capable of altering visual content are widely available and require minimal technical expertise to use. Beyond traditional editing, artificial intelligence-based image generation systems are now capable of producing highly realistic images that mimic the visual characteristics of genuine photographs. These systems can generate images that appear internally consistent in terms of lighting, texture, and perspective, making them difficult to distinguish from authentic images through casual review. The increasing prevalence of such synthetic imagery has eroded confidence in visual content, particularly in environments where accuracy and truthfulness are critical.

The growing sophistication of image generation and manipulation has also outpaced many existing detection mechanisms. Techniques that rely on identifying obvious artifacts or inconsistencies may fail when confronted with newer generation models that more accurately replicate natural image statistics. Similarly, approaches that depend on static signatures or fixed heuristics may degrade over time as manipulation techniques evolve. In the absence of adaptive or context-aware mechanisms, systems tasked with evaluating image authenticity may generate increasing rates of false positives or false negatives, undermining their usefulness and trustworthiness.

Another challenge arises from the reuse of images across unrelated contexts. Digital images can be easily copied and repurposed, allowing a single image to appear in multiple listings, records, or representations that may not correspond to the same real-world subject. Without mechanisms to correlate an image to a specific external identifier or contextual record, it becomes difficult to determine whether an image has been improperly reused or misattributed. This issue is particularly acute in environments where images are expected to correspond to unique assets, locations, or events, and where reuse may constitute a misrepresentation.

Manual review processes are commonly employed to address some of these challenges, but such processes are inherently limited. Human reviewers may lack access to sufficient contextual information to make accurate determinations, and subjective judgments can vary between reviewers. Moreover, manual review does not scale efficiently as image volumes increase. High-throughput platforms require automated solutions capable of operating consistently and at speed, while still providing meaningful assessments of authenticity. Reliance on manual workflows also introduces latency and cost, which can be prohibitive in competitive or time-sensitive environments.

Automated systems that focus exclusively on visual analysis also face inherent constraints. While image content can be evaluated for internal consistency, visual plausibility alone does not establish that an image accurately represents a specific real-world subject or condition. An image may appear realistic while still being unrelated to the asset or event it claims to depict. Without the ability to correlate visual features with external contextual data, purely visual approaches may be insufficient to address many real-world authentication requirements.

Conversely, systems that emphasize metadata validation without robust visual analysis may fail when metadata is missing, altered, or spoofed. Metadata fields can be manipulated using readily available tools, and the presence of metadata does not guarantee that the visual content of the image has not been altered. As a result, approaches that rely solely on metadata checks may provide a false sense of security or may exclude legitimate images that have undergone benign processing steps.

The lack of standardized mechanisms for conveying image authenticity information across platforms further complicates the landscape. Different systems may apply different criteria or thresholds when evaluating images, resulting in inconsistent outcomes as images move between environments. In many cases, downstream platforms have no visibility into how an image was evaluated upstream or what factors contributed to an authenticity determination. This opacity limits interoperability and makes it difficult to establish shared trust frameworks across organizational boundaries.

Regulatory and compliance considerations also contribute to the need for improved image authentication solutions. As digital imagery becomes central to disclosures, advertising, and representations made to consumers or regulators, organizations face increasing scrutiny regarding the accuracy of visual content. The inability to demonstrate reasonable steps taken to verify image authenticity may expose organizations to legal, financial, or reputational risk. At the same time, overly restrictive systems that reject images without clear justification may hinder legitimate business operations or user participation.

Another technical consideration involves the long-term evolution of authentication systems. Static models or rule sets may become obsolete as capture devices, image formats, and manipulation techniques change. Systems that cannot incorporate feedback from verified outcomes or adapt to new patterns may struggle to maintain effectiveness over time. The dynamic nature of the digital imaging ecosystem necessitates solutions that can evolve in response to changing conditions without requiring constant manual reconfiguration.

In addition, many existing approaches lack mechanisms for generating meaningful, machine-readable outputs that can be consumed by downstream systems. Binary pass-fail determinations may be insufficient for nuanced decision-making, particularly in environments where images may warrant different handling based on degrees of confidence or risk. There is a need for approaches that can produce structured assessments or scores reflecting multiple dimensions of authenticity, enabling more flexible integration into automated workflows.

The convergence of these factors-metadata loss, advanced manipulation, image reuse, scalability constraints, and evolving technical landscapes—has created a growing gap between the reliance placed on digital images and the ability to reliably authenticate them. As images continue to serve as foundational inputs to automated systems and human decision-making alike, this gap poses systemic challenges that extend beyond any single industry or application. Addressing these challenges requires rethinking how images are evaluated, how contextual information is preserved or inferred, and how authenticity determinations are communicated across platforms.

Accordingly, there exists a clear need in the field for improved systems and methods capable of authenticating digital images in a robust, scalable, and adaptive manner. Such solutions should address the limitations of approaches that rely exclusively on metadata or visual analysis, accommodate common image handling workflows, and provide consistent and auditable outputs suitable for integration into diverse digital ecosystems. The continued growth of digital imaging and artificial intelligence technologies underscores the importance of developing technical mechanisms that can restore and maintain trust in visual representations without imposing undue friction on legitimate use cases.

SUMMARY OF THE INVENTION

The present invention relates to a system and method for authenticating digital images using a combined metadata-based and artificial intelligence-driven analysis framework. In operation, the system may receive a digital image captured by an imaging device or uploaded from an external source and evaluate the image using both contextual data associated with the image and visual characteristics derived from the image content. The system may validate capture-related data, associate the image with one or more external identifiers, and analyze visual features indicative of authenticity, manipulation, reuse, or synthetic generation. Based on these evaluations, the system may generate an authenticity determination, score, or classification indicating whether the image reliably represents a real-world subject under expected capture conditions. The system may further support secure processing, internal tracking, and distribution of verified images across one or more platforms without exposing sensitive authentication data.

The present invention provides several technical advantages over existing image evaluation approaches that rely solely on manual review, isolated metadata checks, or standalone visual classifiers. By correlating visual image features with contextual and extrinsic data, the system improves the reliability of authenticity determinations even when images have undergone common processing steps such as resizing, compression, or platform-specific handling. The combined analytical framework reduces susceptibility to spoofed or missing metadata and improves detection of reused, manipulated, or artificially generated imagery that may otherwise appear visually plausible. Additionally, the system enables scalable, automated evaluation of large image volumes while providing consistent, auditable outcomes suitable for downstream integration. The adaptive nature of the analysis further allows the system to improve accuracy over time as verified image data is incorporated, resulting in a more robust and resilient image authentication capability across evolving digital environments.

In a first implementation of the invention, a system for authenticating a digital image may include at least one processor and a non-transitory computer-readable medium storing instructions that, when executed by the at least one processor, cause the system to receive a digital image obtained from an image capture device or an external image source, obtain contextual data associated with the digital image including at least one of capture-related data, device-related data, location-related data, time-related data, or an external identifier associated with a subject depicted in the digital image, analyze visual characteristics of the digital image using one or more machine learning models to identify features indicative of authenticity, manipulation, reuse, or synthetic generation, correlate the analyzed visual characteristics with the contextual data to determine whether the digital image is consistent with expected capture conditions associated with the contextual data, generate an authenticity determination for the digital image based on the correlation of the visual characteristics and the contextual data, and output an authentication result indicating whether the digital image satisfies one or more authenticity criteria.

In another aspect, wherein the contextual data associated with the digital image may include metadata embedded in the digital image at a time of capture.

In another aspect, wherein the metadata may include at least one of capture timestamp information, geographic location information, device identification information, or camera configuration information.

In another aspect, wherein the contextual data may further include an external identifier associated with a physical object depicted in the digital image.

In another aspect, wherein the external identifier may include an asset identifier corresponding to the depicted physical object.

In another aspect, wherein the asset identifier may include a vehicle identification number.

In another aspect, wherein analyzing the visual characteristics of the digital image may include evaluating lighting consistency, shadow orientation, or reflection behavior within the digital image.

In another aspect, wherein analyzing the visual characteristics may further include detecting pixel-level artifacts indicative of image manipulation or synthetic image generation.

In another aspect, wherein analyzing the visual characteristics may include comparing the digital image to a database of previously received images to identify reuse or duplication.

In another aspect, wherein correlating the analyzed visual characteristics with the contextual data may include determining whether the visual characteristics are logically consistent with expected capture conditions associated with the contextual data.

In another aspect, wherein generating the authenticity determination may include assigning an authenticity score to the digital image.

In another aspect, wherein the authenticity score may be generated based on a weighted combination of multiple authenticity indicators.

In another aspect, wherein the authentication result may include a classification indicating that the digital image is verified, flagged for review, or rejected.

In another aspect, wherein the system may further store the authenticity determination in association with the digital image in a secure data store.

In another aspect, wherein the system may further generate a certification token associated with the digital image when the authenticity determination satisfies one or more predefined criteria.

In another aspect, wherein the certification token may be configured for distribution to one or more external platforms without exposing underlying authentication data.

In another aspect, wherein the system may be configured to process a plurality of digital images in an automated and scalable manner without manual review.

In another aspect, wherein one or more machine learning models used to analyze the digital image may be updated over time based on digital images that satisfy authenticity criteria.

In another aspect, wherein the updated machine learning models may incorporate verified digital images as training data to improve subsequent authenticity determinations.

In another implementation of the invention, a system for authenticating a digital image may include at least one processor and a non-transitory computer-readable medium storing instructions that, when executed by the at least one processor, cause the system to receive a digital image captured by an imaging device, verify retention of capture metadata embedded in the digital image at a time of capture including at least a capture timestamp and geographic location information, associate the digital image with an asset identifier corresponding to a physical object depicted in the digital image, analyze visual characteristics of the digital image using one or more machine learning models trained on verified images to evaluate lighting consistency, shadow orientation, reflection behavior, and pixel-level artifacts indicative of image manipulation or synthetic generation, compare the digital image to a database of previously authenticated images to detect reuse or duplication across different asset identifiers, correlate results of the visual analysis with the capture metadata and the asset identifier to determine consistency with expected capture conditions, generate an authenticity score based on a weighted combination of multiple authenticity indicators derived from the visual analysis and the capture metadata, classify the digital image as verified, flagged for review, or rejected based on the authenticity score, and generate a certification token associated with the digital image for distribution to one or more external platforms without exposing the capture metadata or the asset identifier.

In yet another implementation of the invention, a method for authenticating a digital image may include receiving, by at least one processor, a digital image captured by an imaging device, verifying retention of capture metadata embedded in the digital image at a time of capture including at least a capture timestamp and geographic location information, associating the digital image with an asset identifier corresponding to a physical object depicted in the digital image, analyzing visual characteristics of the digital image using one or more machine learning models trained on verified images to evaluate lighting consistency, shadow orientation, reflection behavior, and pixel-level artifacts indicative of image manipulation or synthetic generation, comparing the digital image to a database of previously authenticated images to detect reuse or duplication across different asset identifiers, correlating results of the visual analysis with the capture metadata and the asset identifier to determine consistency with expected capture conditions, generating an authenticity score based on a weighted combination of multiple authenticity indicators derived from the visual analysis and the capture metadata, classifying the digital image as verified, flagged for review, or rejected based on the authenticity score, and generating a certification token associated with the digital image for distribution to one or more external platforms without exposing the capture metadata or the asset identifier.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENT

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present disclosure relates to technical systems and methods for authenticating digital images by evaluating visual characteristics of image content in conjunction with contextual data associated with image capture and subsequent use. The embodiments described herein address technical challenges arising from the widespread reliance on digital images as representations of real-world subjects, particularly in environments where images may be altered, reused, synthetically generated, or stripped of metadata during transmission and storage. The disclosed systems and methods operate to improve the reliability of image authenticity determinations through automated, computer-implemented analysis rather than subjective manual inspection. The technical solutions described herein are applicable across a variety of industries and deployment environments and may be implemented using hardware, software, or combinations thereof. Although particular embodiments are illustrated and described, the scope of the disclosure is not limited to the specific configurations shown.

Figure 1:
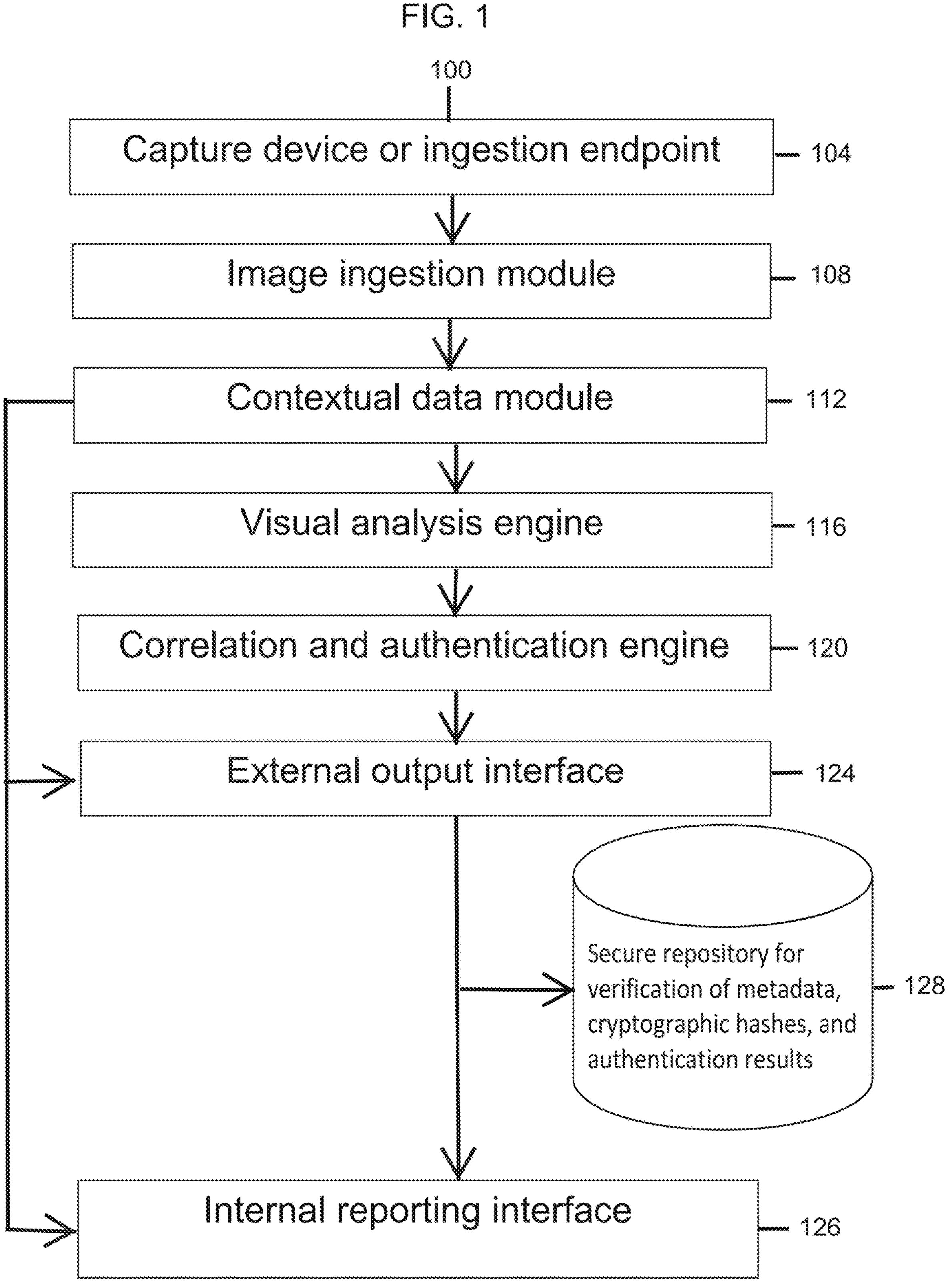
FIG. 1 presents a schematic block diagram of an image authentication system, illustrating an image input source in communication with an image ingestion module, a contextual data module, a visual analysis engine implementing one or more machine learning models, a correlation and authentication engine configured to generate an authenticity determination, and an output interface configured to provide an authentication result or certification token.

Referring initially to FIG. 1, a schematic block diagram of an image authentication system 100 is illustrated. The image authentication system 100 may be implemented using one or more computing devices, servers, virtual machines, cloud-based resources, or distributed processing environments. The system 100 may operate as a centralized service, a federated service, or a locally deployed solution integrated into existing infrastructure. The architecture illustrated in FIG. 1 enables modular processing, such that individual components may be scaled, replaced, or updated independently without requiring changes to the overall system structure. This modularity supports adaptability as image capture devices, image formats, and manipulation techniques evolve over time.

The image authentication system 100 may be configured to receive digital images from one or more capture devices or ingestion endpoints 104. In some implementations, the capture device or ingestion endpoint 104 may operate within a trusted capture environment, such as a controlled imaging device, sensor-equipped platform, or application configured to enforce capture-time constraints and metadata retention. In other implementations, the capture device or ingestion endpoint 104 may correspond to an external or untrusted source, including a content management system, listing platform, third-party marketplace, or application programming interface through which images are uploaded or transmitted after capture. As a result, digital images received at the capture device or ingestion endpoint 104 may originate from heterogeneous capture environments and may have undergone varying degrees of intermediate processing prior to receipt by the image authentication system 100. The system 100 is therefore configured to authenticate images regardless of whether the images originate from a trusted capture environment or from external ingestion workflows over which the system does not exert direct control.

Digital images received from the capture device or ingestion endpoint 104 may be passed to an image ingestion module 108. The image ingestion module 108 may be configured to receive, validate, normalize, and queue incoming digital images for subsequent processing by downstream system components. Validation performed by the image ingestion module 108 may include verifying file integrity, confirming supported file formats, detecting corrupted or incomplete image data, and identifying whether capture-related metadata has been retained. Normalization may include resizing images, converting color spaces, standardizing bit depth, or preparing image representations suitable for machine learning inference. The image ingestion module 108 may further extract available metadata embedded within the image file and make such metadata accessible to other system components, thereby enabling contextual evaluation and downstream correlation regardless of the trust level associated with the capture device or ingestion endpoint 104.

In some implementations, the image authentication system 100 may define a logical trust boundary associated with the capture device or ingestion endpoint 104, distinguishing images originating from a trusted capture environment from images received through external or post-capture ingestion workflows. A trusted capture environment may correspond to an imaging context in which capture-time constraints, metadata retention policies, cryptographic signing, or device-level controls are enforced at or prior to image acquisition. Conversely, images received from external ingestion endpoints may lack such assurances and may have been modified, recompressed, or transmitted through intermediary systems prior to receipt. The image authentication system 100 may be configured to adapt its authentication evaluation based on the trust classification associated with the capture device or ingestion endpoint 104, thereby enabling differentiated handling, scoring, or verification logic without requiring exclusive reliance on trusted hardware or capture conditions.

The image authentication system 100 may further include a contextual data module 112 configured to obtain contextual data associated with each received digital image. Contextual data obtained by the contextual data module 112 may include metadata embedded in the digital image at a time of capture, such as capture timestamp information, geographic location information, device identification information, camera configuration parameters, or combinations thereof. In addition to embedded metadata, the contextual data module 112 may obtain external identifiers associated with the image, including identifiers supplied by upstream systems or user input. These external identifiers may correspond to a physical object or subject depicted in the image, enabling association between the image and real-world assets.

The contextual data module 112 may further operate to verify retention of capture metadata embedded in the digital image at the time of capture. Verification may include checking whether metadata fields are present, whether values fall within expected ranges, and whether metadata appears logically consistent when compared against other contextual information. For example, capture timestamps may be evaluated relative to known operational windows, or geographic coordinates may be evaluated for plausibility. The contextual data module 112 may flag images with missing or inconsistent metadata while still allowing such images to proceed through subsequent visual analysis. This approach enables the system 100 to function even when metadata has been partially removed by external workflows.

The contextual data module 112 may also associate the digital image with an asset identifier corresponding to a physical object depicted in the image. The asset identifier may represent any identifier that uniquely or semi-uniquely identifies a subject, such as an inventory identifier, serial number, listing identifier, or other reference. In automotive-related implementations, the asset identifier may include a vehicle identification number. Associating images with asset identifiers enables the system 100 to detect reuse of images across unrelated assets and to evaluate whether visual characteristics of the image align with expected characteristics of the referenced asset. This association further supports downstream auditing and verification workflows.

The image authentication system 100 may further include a visual analysis engine 116 configured to analyze visual characteristics of the digital image. The visual analysis engine 116 may employ one or more machine learning models trained on verified images to identify features indicative of authenticity, manipulation, reuse, or synthetic generation. The machine learning models may include convolutional neural networks, transformer-based models, hybrid architectures, or other frameworks suitable for image analysis. The visual analysis engine 116 may operate on raw pixel data, intermediate feature representations, or learned embeddings derived from the image. The engine may produce multiple analysis outputs corresponding to different visual attributes.

Visual characteristics evaluated by the visual analysis engine 116 may include lighting consistency within the digital image. Lighting analysis may involve evaluating illumination gradients, light source directionality, brightness distribution, and color temperature consistency across different regions of the image. The visual analysis engine 116 may further evaluate shadow orientation to determine whether shadows cast by objects align with inferred or expected light sources. Reflection behavior on reflective surfaces such as glass, metal, or paint may also be analyzed to determine whether reflections correspond logically to the surrounding environment. These evaluations may collectively indicate whether an image exhibits characteristics consistent with real-world capture conditions.

The visual analysis engine 116 may further analyze pixel-level artifacts indicative of image manipulation or synthetic image generation. Such artifacts may include irregular textures, unnatural transitions, warped edges, repeating patterns, or inconsistencies in fine detail. Noise characteristics may be evaluated to determine whether noise patterns align with those expected from known camera sensors or capture devices. The visual analysis engine 116 may also evaluate compression artifacts and image degradation patterns to distinguish between benign processing and manipulation. These pixel-level analyses may be combined with higher-level semantic analysis to improve robustness across diverse image types.

In addition to evaluating individual images, the visual analysis engine 116 may compare the digital image to a database of previously received or previously authenticated images. This comparison may be performed to detect reuse or duplication of images across different asset identifiers. Comparison techniques may include perceptual hashing, similarity metrics, or learned similarity embeddings generated by machine learning models. Detecting reuse allows the system 100 to identify scenarios in which a single image is improperly associated with multiple assets or listings. This capability supports enforcement of image integrity across large image collections.

The image authentication system 100 may further include a correlation and authentication engine 120 configured to correlate results produced by the visual analysis engine 116 with contextual data obtained by the contextual data module 112. Correlation may include determining whether visual characteristics identified during analysis are logically consistent with expected capture conditions associated with the contextual data. For example, inferred lighting conditions may be compared against capture time information, or environmental features may be compared against geographic location data. The correlation and authentication engine 120 may apply rules, statistical models, or learned correlation functions to perform this evaluation.

Based on the correlation of visual characteristics and contextual data, the correlation and authentication engine 120 may generate an authenticity determination for the digital image. The authenticity determination may include assigning an authenticity score that represents a quantitative measure of confidence that the image accurately represents the referenced subject. The authenticity score may be generated using a weighted combination of multiple authenticity indicators derived from visual analysis and contextual evaluation. Weights applied to different indicators may be configurable, adaptive, or learned over time. The authenticity determination may support nuanced decision-making beyond binary acceptance or rejection.

The image authentication system 100 may further classify the digital image based on the authenticity determination. Classification categories may include verified, flagged for review, or rejected. Images classified as verified may satisfy predefined authenticity criteria, while images flagged for review may exhibit ambiguous or borderline characteristics. Images classified as rejected may exhibit strong indicators of manipulation, reuse, or inconsistency. These classifications may be consumed by downstream systems to control publication, display, or further processing of images.

The image authentication system 100 may further include an external output interface 124 configured to output an authentication result associated with a processed digital image. The authentication result may include an authenticity score, a classification indicator, or other structured data describing an outcome of the authentication process. In some implementations, the external output interface 124 may generate a certification token associated with the digital image, wherein the certification token is suitable for transmission to one or more external systems, platforms, or services to indicate that the digital image has been evaluated by the image authentication system 100. The certification token may be configured to enable downstream verification without disclosing underlying capture metadata, contextual data, or asset identifiers. In certain implementations, verification artifacts associated with the authentication result, including metadata validation data, cryptographic hashes, and authentication outputs, may be stored within a secure repository 128 configured to support subsequent verification, auditing, or compliance-related analysis, and may additionally be made available to an internal reporting interface 126.

Figure 2:
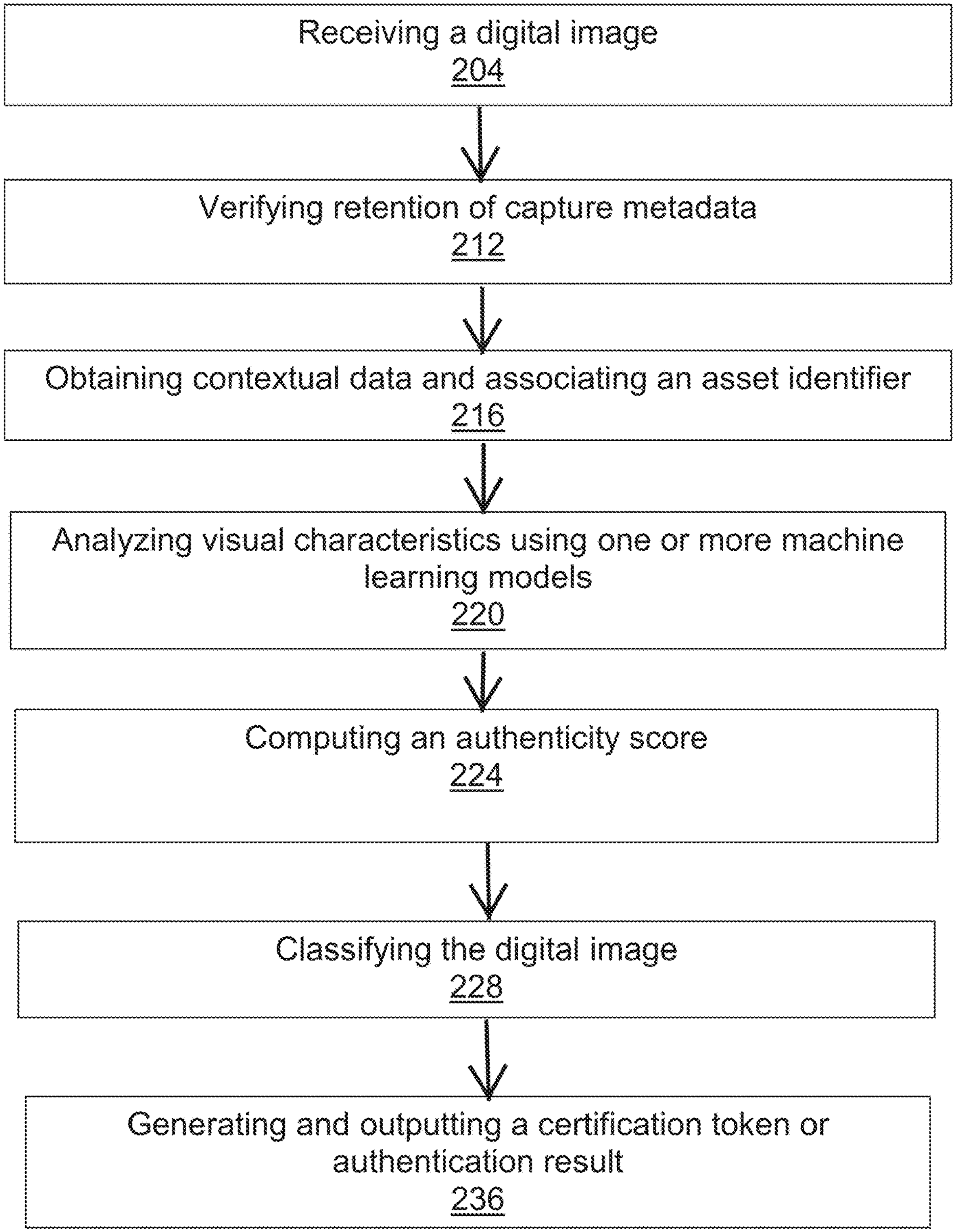
FIG. 2 presents a flowchart illustrating a method for authenticating a digital image, showing sequential steps including receiving a digital image, verifying retention of capture metadata, obtaining contextual data and associating an asset identifier, analyzing visual characteristics using machine learning models, detecting reuse or manipulation indicators, correlating visual analysis results with contextual data, generating an authenticity score, classifying the digital image, and outputting an authentication result or certification token. Like reference numerals refer to like parts throughout the several views of the drawings.

The secure repository 128 may further be accessed by the visual analysis engine 116 or other system components to retrieve previously authenticated images or verification artifacts for reuse detection, model retraining, or audit validation Referring now to FIG. 2, a flowchart illustrating a method for authenticating a digital image 200 is shown. The method 200 may be performed by the image authentication system 100 described above, although other computing systems may also perform the method. The method 200 illustrates a sequence of operations that may be executed automatically by one or more processors. The operations illustrated in FIG. 2 may be performed sequentially, concurrently, or in varying order unless otherwise specified.

The method 200 may begin by receiving a digital image captured by an imaging device or obtained from an external image source, such that image data becomes available for processing within the system 204. Receiving the image may include accepting image data transmitted over a network, uploaded through a user interface, or retrieved from storage. The received image may have been resized, compressed, or otherwise processed prior to receipt. The method 200 is configured to accommodate such images without requiring pristine capture files.

The method 200 may further include verifying retention of capture metadata embedded in the digital image at the time of capture 208. Verification may include checking whether metadata fields such as capture timestamp and geographic location information are present within the image file. Verification may also include evaluating whether metadata values fall within expected ranges or appear logically consistent. Images lacking metadata may still proceed through subsequent analysis steps, although metadata availability may influence scoring or classification outcomes. The method 200 may further include obtaining contextual data associated with the digital image and associating the image with an asset identifier corresponding to a physical object depicted in the image 212. Obtaining contextual data may involve retrieving records from external databases or receiving identifiers alongside the image. Associating the image with an asset identifier enables subsequent correlation between visual content and expected asset characteristics. This association supports detection of image reuse across different assets.

The method 200 may further include analyzing visual characteristics of the digital image using one or more machine learning models trained on verified images 216. Visual analysis may evaluate lighting consistency, shadow orientation, reflection behavior, and pixel-level artifacts indicative of image manipulation or synthetic generation. The analysis may produce multiple intermediate indicators representing different aspects of authenticity. These indicators may be retained for correlation and scoring.

The method 200 may further include comparing the digital image to a database of previously authenticated images to detect reuse or duplication across different asset identifiers 220. Comparison may be performed using perceptual similarity metrics or learned embeddings. Detecting reuse allows the system to identify misrepresentation and enforce integrity across image collections. This step may operate independently of metadata availability.

The method 200 may further include correlating results of the visual analysis with the contextual data and asset identifier to determine consistency with expected capture conditions 224. Correlation may involve evaluating whether visual features align with metadata-derived expectations or learned patterns associated with verified images. The correlation output may represent a confidence measure or logical consistency determination.

The method 200 may further include generating an authenticity score based on a weighted combination of multiple authenticity indicators derived from visual analysis and contextual data 228. The authenticity score may represent a continuous or discrete value. Different applications may apply different thresholds to the score depending on risk tolerance. The score may be logged for auditing and retraining purposes.

The method 200 may further include classifying the digital image as verified, flagged for review, or rejected based on the authenticity score 224. Classification may drive downstream actions such as publication approval or manual escalation. Classification outcomes may be configurable and may vary by application domain.

The method 200 may further include generating and outputting a certification token or authentication result associated with the digital image 236. The certification token may be distributed to external platforms without exposing capture metadata or asset identifiers. The authentication result may include structured data suitable for automated consumption. This step enables integration with third-party systems.

In alternative embodiments, the image authentication system 100 may be deployed in edge computing environments, where portions of visual analysis or metadata evaluation occur on capture devices prior to transmission. In other embodiments, the system may operate in batch mode, processing large collections of images asynchronously. Some implementations may incorporate additional contextual signals, such as user behavior data or historical asset information, to augment authenticity determinations. In further embodiments, the certification token generated by the system may be embedded within image files, stored separately, or represented as a cryptographic reference. The disclosed architecture supports such variations without departing from the scope of the appended claims.

In summary, the disclosed systems and methods provide a computer-implemented framework for authenticating digital images through coordinated evaluation of visual characteristics and contextual data associated with image capture and use. By leveraging machine learning-based visual analysis in combination with metadata validation, asset identifier association, duplication detection, and correlation logic, the framework enables automated generation of authenticity determinations that are suitable for scalable deployment across diverse digital environments. The architecture supports processing of images obtained from heterogeneous sources, accommodates common image handling workflows, and produces structured authentication results that may be consumed by downstream platforms without exposing sensitive information. The described approach further supports adaptive improvement over time through incorporation of verified images, enabling continued refinement of authenticity evaluation as conditions and technologies evolve.

Although the foregoing detailed description has been presented with reference to particular embodiments, implementations, figures, and examples, it should be understood that these descriptions are provided for purposes of illustration and explanation and are not intended to limit the scope of the disclosure. Various modifications, substitutions, combinations, and rearrangements of the disclosed components, steps, and configurations may be made without departing from the spirit and scope of the appended claims. The features described in connection with one embodiment may be combined with features of other embodiments in any suitable manner, and operations described as occurring in a particular sequence may be performed in a different order or concurrently. Accordingly, the scope of the invention should be determined by the appended claims and their legal equivalents, rather than by the specific examples set forth herein.

What is claimed is:

1. A system for authenticating a digital image, comprising:

at least one processor; and a non-transitory computer-readable medium storing instructions that, when executed by the at least one processor, cause the system to:

receive a digital image obtained from an image capture device or an external image source;

obtain contextual data associated with the digital image, the contextual data including at least one of capture-related data, device-related data, location-related data, time-related data, or an external identifier associated with a subject depicted in the digital image;

analyze visual characteristics of the digital image using one or more machine learning models to identify features indicative of authenticity, manipulation, reuse, or synthetic generation wherein analyzing the visual characteristics includes comparing the digital image to a database of previously received images to identify reuse or duplication;

correlate the analyzed visual characteristics with the contextual data to determine whether the digital image is consistent with expected capture conditions associated with the contextual data;

generate an authenticity determination for the digital image based on the correlation of the visual characteristics and the contextual data; and output an authentication result indicating whether the digital image satisfies one or more authenticity criteria.

2. The system of claim 1, wherein the contextual data includes metadata embedded in the digital image at a time of capture.

3. The system of claim 2, wherein the metadata includes at least one of capture timestamp information, geographic location information, device identification information, or camera configuration information.

4. The system of claim 1, wherein the external identifier includes an asset identifier associated with a physical object depicted in the digital image.

5. The system of claim 4, wherein the asset identifier includes a vehicle identification number.

6. The system of claim 1, wherein analyzing the visual characteristics includes evaluating lighting consistency, shadow orientation, or reflection behavior within the digital image.

7. The system of claim 1, wherein analyzing the visual characteristics includes detecting pixel-level artifacts indicative of image manipulation or synthetic generation.

8. The system of claim 1, wherein correlating the analyzed visual characteristics with the contextual data includes determining whether the visual characteristics are logically consistent with the contextual data.

9. The system of claim 1, wherein generating the authenticity determination includes assigning an authenticity score to the digital image.

10. The system of claim 9, wherein the authenticity score is generated based on a weighted combination of multiple authenticity indicators.

11. The system of claim 1, wherein the authentication result includes a classification indicating that the digital image is verified, flagged for review, or rejected.

12. The system of claim 1, further comprising storing the authenticity determination in association with the digital image in a secure data store.

13. The system of claim 1, wherein the instructions further cause the system to generate a certification token associated with the digital image when the authenticity determination satisfies one or more predefined criteria.

14. The system of claim 13, wherein the certification token is configured for distribution to one or more external platforms without exposing underlying authentication data.

15. The system of claim 1, wherein the system is configured to process a plurality of digital images in an automated and scalable manner without manual review.

16. The system of claim 1, wherein the one or more machine learning models are updated over time based on digital images that satisfy the authenticity criteria.

17. The system of claim 16, wherein the updated machine learning models incorporate verified digital images as training data to improve subsequent authenticity determinations.

18. A system for authenticating a digital image, comprising:

at least one processor; and a non-transitory computer-readable medium storing instructions that, when executed by the at least one processor, cause the system to:

receive a digital image captured by an imaging device;

verify retention of capture metadata embedded in the digital image at a time of capture, the capture metadata including at least a capture timestamp and geographic location information;

associate the digital image with an asset identifier corresponding to a physical object depicted in the digital image;

analyze visual characteristics of the digital image using one or more machine learning models trained on verified images, the visual characteristics including lighting consistency, shadow orientation, reflection behavior, and pixel-level artifacts indicative of image manipulation or synthetic generation;

compare the digital image to a database of previously authenticated images to detect reuse or duplication across different asset identifiers;

correlate results of the visual analysis with the capture metadata and the asset identifier to determine consistency with expected capture conditions;

generate an authenticity score based on a weighted combination of multiple authenticity indicators derived from the visual analysis and the capture metadata;

classify the digital image as verified, flagged for review, or rejected based on the authenticity score; and generate a certification token associated with the digital image for distribution to one or more external platforms without exposing the capture metadata or the asset identifier.

19. A method for authenticating a digital image, comprising:

receiving, by at least one processor, a digital image captured by an imaging device;

verifying retention of capture metadata embedded in the digital image at a time of capture, the capture metadata including at least a capture timestamp and geographic location information;

associating the digital image with an asset identifier corresponding to a physical object depicted in the digital image;

analyzing visual characteristics of the digital image using one or more machine learning models trained on verified images, the visual characteristics including lighting consistency, shadow orientation, reflection behavior, and pixel-level artifacts indicative of image manipulation or synthetic generation;

comparing the digital image to a database of previously authenticated images to detect reuse or duplication across different asset identifiers;

correlating results of the visual analysis with the capture metadata and the asset identifier to determine consistency with expected capture conditions;

generating an authenticity score based on a weighted combination of multiple authenticity indicators derived from the visual analysis and the capture metadata;

classifying the digital image as verified, flagged for review, or rejected based on the authenticity score; and generating a certification token associated with the digital image for distribution to one or more external platforms without exposing the capture metadata or the asset identifier.

20. A system for authenticating a digital image, comprising:

at least one processor; and a non-transitory computer-readable medium storing instructions that, when executed by the at least one processor, cause the system to:

receive a digital image obtained from an image capture device or an external image source;

obtain contextual data associated with the digital image, the contextual data including at least one external identifier associated with a subject depicted in the digital image, wherein the external identifier includes an asset identifier associated with the physical object depicted in the digital image, and wherein the asset identifier includes a vehicle identification number;

analyze visual characteristics of the digital image using one or more machine learning models to identify features indicative of authenticity, manipulation, reuse, or synthetic generation;

correlate the analyzed visual characteristics with the contextual data to determine whether the digital image is consistent with expected capture conditions associated with the contextual data;

generate an authenticity determination for the digital image based on the correlation of the visual characteristics and the contextual data; and output an authentication result indicating whether the digital image satisfies one or more authenticity criteria.

21. The system of claim 20, wherein the contextual data includes metadata embedded in the digital image at a time of capture.

22. The system of claim 21, wherein the metadata includes at least one of capture timestamp information, geographic location information, device identification information, or camera configuration information.

23. The system of claim 21, wherein analyzing the visual characteristics includes evaluating lighting consistency, shadow orientation, or reflection behavior within the digital image.

24. The system of claim 20, wherein analyzing the visual characteristics includes detecting pixel-level artifacts indicative of image manipulation or synthetic generation.

25. The system of claim 20, wherein analyzing the visual characteristics includes comparing the digital image to a database of previously received images to identify reuse or duplication.

26. The system of claim 20, wherein correlating the analyzed visual characteristics with the contextual data includes determining whether the visual characteristics are logically consistent with the contextual data.

27. The system of claim 20, wherein generating the authenticity determination includes assigning an authenticity score to the digital image.

28. The system of claim 27, wherein the authenticity score is generated based on a weighted combination of multiple authenticity indicators.

29. The system of claim 4, wherein the authentication result includes a classification indicating that the digital image is verified, flagged for review, or rejected.

30. The system of claim 20, further comprising storing the authenticity determination in association with the digital image in a secure data store.

31. The system of claim 20, wherein the instructions further cause the system to generate a certification token associated with the digital image when the authenticity determination satisfies one or more predefined criteria.

32. The system of claim 31, wherein the certification token is configured for distribution to one or more external platforms without exposing underlying authentication data.

33. The system of claim 20, wherein the system is configured to process a plurality of digital images in an automated and scalable manner without manual review.

34. The system of claim 20, wherein the one or more machine learning models are updated over time based on digital images that satisfy the authenticity criteria.

35. The system of claim 34, wherein the updated machine learning models incorporate verified digital images as training data to improve subsequent authenticity determinations.

* * * * *